United States Patent [19]
Kaneko

[11] Patent Number: 6,115,158
[45] Date of Patent: Sep. 5, 2000

[54] OPTICAL COMMUNICATION SYSTEM AND OPTICAL TRANSMITTING DEVICE APPLIED THERETO

[75] Inventor: Tomoyuki Kaneko, Tokyo, Japan

[73] Assignee: NEC Corporation, Tokyo, Japan

[21] Appl. No.: 08/975,177

[22] Filed: Nov. 20, 1997

[30] Foreign Application Priority Data

Nov. 22, 1996 [JP] Japan ................................. 8-311760

[51] Int. Cl.[7] .................................................. H04J 14/02
[52] U.S. Cl. ......................... 359/127; 359/124; 359/110
[58] Field of Search ........................... 359/127, 133–134, 359/110, 124

[56] References Cited

U.S. PATENT DOCUMENTS

| | | | |
|---|---|---|---|
| 5,894,362 | 4/1999 | Onaka et al. | 359/124 |
| 5,978,119 | 11/1999 | Giles et al. | 359/127 |

*Primary Examiner*—Kinfe-Michael Negash
*Attorney, Agent, or Firm*—Ostrolenk, Faber, Gerb & Soffen, LLP

[57] ABSTRACT

In an optical communication system and an optical transmitting device applied thereto, there are provided two LDs to an optical transmission circuit within a branch station, one of which for generating a transmission optical signal with a wavelength $\lambda i$, and the other for generating an adjustment optical signal with a wavelength $\lambda x$. Those two optical signals with wavelengths $\lambda i$ and $\lambda x$ are to be integrated at an optical coupler so as to be transmitted to a branching device where ADM is to be conducted, after passing through an optical amplifier where an output level is controlled to be fixed. Therefore, by adjusting with an adjuster the output level of the LD generating the adjustment optical signal, the level of the adjustment optical signal is adjusted, which makes it possible to alter the level of a transmission signal with the wavelength $\lambda i$ within the output from the optical amplifier.

2 Claims, 8 Drawing Sheets

F I G. 3A
PRIOR ART
F I G. 3B
PRIOR ART
F I G. 3C
PRIOR ART
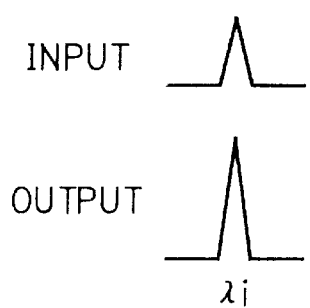
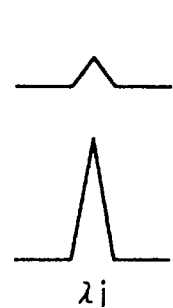
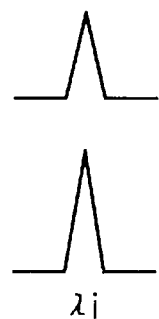

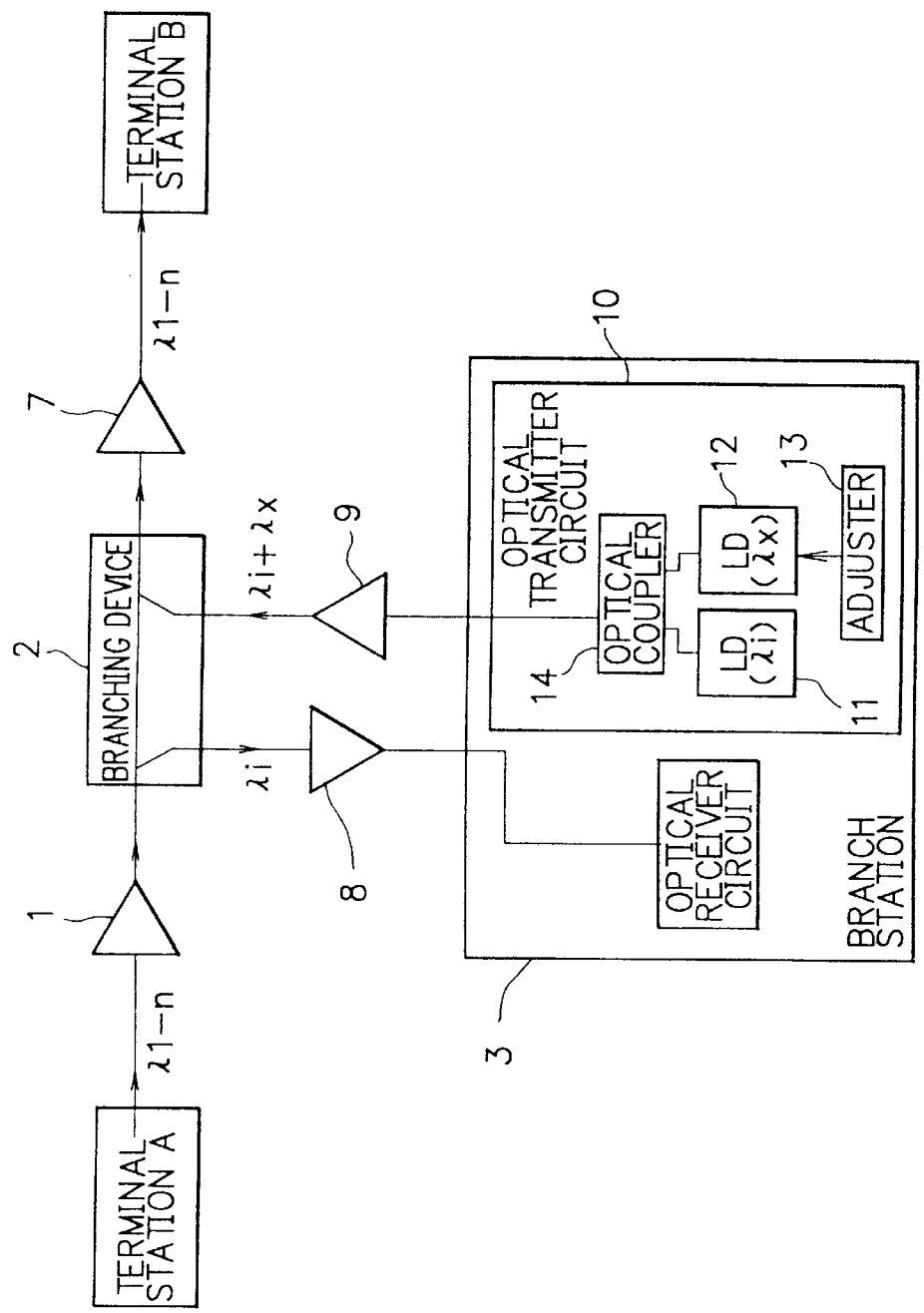

FIG. 7A
FIG. 7B
FIG. 7C
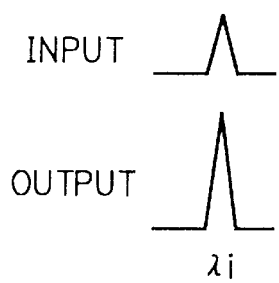
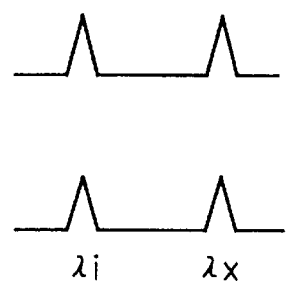
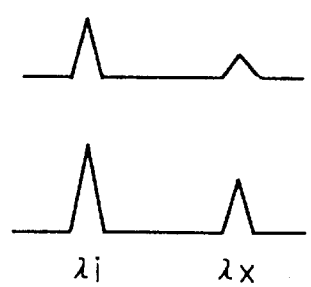

OPTICAL COMMUNICATION SYSTEM AND OPTICAL TRANSMITTING DEVICE APPLIED THERETO

BACKGROUND OF THE INVENTION

The present invention relates to an optical communication system having ADM (add drop multiplexing/branching and insertion) function for conducting WDM (wavelength division multiplex) transmission and to an optical transmitting device suitable for this optical communication system.

Description of the Related Art

There have been many cases presented in the scientific society and such concerning the optical ADM technique with regard to the conventional WDM transmitting method, although there are few prior art examples for the optical communication system applying the optical ADM technique for the optical communication system is expected to be put into practice more in future. However, it is easy to speculate the state of the system basing on the optical transmitting method being practiced up to this day. FIG. 1 shows one of such systems as a conventional example.

According to FIG. 1, a terminal station A is to optical-integrate a plurality of optical signals having different wavelengths $\lambda 1 \sim \lambda n$ so as to output the signals to one optical fiber cable. These optical signals are to pass through an optical amplifier 1 so as to be sent to a branching device 2. At this point, an optical signal having a wavelength $\lambda i$ is to be branched off to be transmitted to a branch station 3. At the branch station 3, the optical signal with the wavelength $\lambda i$ is received by an optical receiver circuit 4. On the other hand, the same wavelength $\lambda i$ being branched off at the above branching device is generated at a LD (optical semiconductor laser diode) 6 being adopted to an optical transmitter circuit 5, so as to be sent to the branching device 2.

The branching device 2 is to insert the optical signal of the wavelength $\lambda i$ to the optical signals from the optical amplifier 1 with the wavelengths $\lambda 1 \sim \lambda n$ (excluding $\lambda i$) so as to have the optical signals pass through an optical amplifier 7 and sent to a terminal station B. In this case, a controlling method is applied to the optical amplifiers 1 and 7 for fixing the output levels thereof even when the input levels thereof are to change.

Moreover, when the interval between the branch station 3 and the branching device 2 is long as it is shown in FIG. 2, the structure takes a form where optical amplifiers 8 and 9 are set in between the branch station 3 and the branching device 2. These optical amplifiers 8 and 9 are employing the output level fix control method.

Furthermore, as to the output level of the branching device 2 conducting branching or inserting, the output level of the optical signal with the wavelengths $\lambda 1 \sim \lambda n$ (excluding $\lambda i$) and the output level of the optical signal with the wavelength $\lambda i$ have to be the same. The reason for that is that, if the output levels are different, signal-to-noise ratios (S/N) of the signal with the wavelength $\lambda i$ and the other signals would not match, which will affect the transmission feature.

Next, the operation of the optical amplifier is to be described with reference to FIG. 3. The optical amplifier is being controlled so that the output level is fixed even if the input level is altered when the output of the transmission line or the optical amplifier of the former stage is changed. That is to say, as it is shown in FIGS. 3A, 3B, and 3C, the optical amplifier is controlled so that signals with constant level are outputted at all times even if the input signals are inputted with altered levels.

As to the conventional system shown in FIG. 1, matching the level of transmission optical signals with the wavelengths $\lambda 1 \sim \lambda n$ (excluding $\lambda i$) which are not being branched off at the branching device and the level of an insertion optical signal with the wavelength $\lambda i$ is possible by altering the insertion signal level at the branch station 3. However, as it is shown in FIG. 2, when the interval between the branch station 3 and the branching device 2 is long, optical amplifiers 8 and 9 for amplifying the signal are inserted in between the branch station 3 and the branching device 2. Generally, as it is mentioned above, these optical amplifiers take the controlling method for fixing the output level even if the input level alters to some extent. Therefore, in setting the cable, the length of the cable should be adjusted or the output level of the optical amplifier right before being inserted to the branching device 2 should be adjusted in order to have the output level of each of the signals from the branching device fixed. As to the way of adjusting the length of the cable, for there is a transmission loss of 0.2 dB per 1 km of length, when there is a gap of 1 dB, an extra 5 km of cable needs to be connected. In any cases, there is a deterioration on the workability of the system at the time of cable setting.

In addition, when it is desired that the number of signals is increased between the terminal stations A and B, or for example, when it is desired that the signals are increased from two signals $\lambda 1$ and $\lambda 2$ to four signals $\lambda 1$ to $\lambda 4$, the output level of the optical amplifier is reduced to half the level as compared to the case when there are two signals. Accordingly, the input level of the branching device 2 is also reduced to half. Therefore, for the input level of the branching device 2 is reduced, it would no longer match with the input level from the branch station.

The first problem as to the above mentioned conventional example is the deterioration on workability of the system at the time of cable setting. The reason for that is that the length of the cable is adjusted or the output level of the optical amplifier before the branching device is adjusted in order to fix the output level of each of the signals from the branching device.

The second problem concerning the above conventional example is that the output level is not capable of being adjusted after the cable is being set. That is because the input level of the branching device is always constant even when the level is adjusted at the branch station since the optical amplifier is controlled to have its output level fixed.

The third problem with regard to the conventional example is that the transmission capacity can not be increased after the system is being built. The reason for that is that the output level of the optical amplifier is controlled to be fixed, which leads to a decrease in the input level of the branching device when the number of signals is increased at the terminal station A, thus causing inconsistency with the input level from the branch station.

SUMMARY OF THE INVENTION

It is therefore an object of the present invention to solve the above mentioned problems and to provide an optical communication system and an optical transmitting device applied thereto, which is capable of easily adjusting the levels of transmission optical signals and increasing the transmission capacity after the system is being built.

According to the present invention, there is provided an optical transmitting device having ADM function and conducting WDM transmission comprising: a plurality of optical signal generating means for generating a plurality of optical signals having different wavelengths; an integrating means for integrating said plurality of optical signals; and an adjusting means for adjusting levels of optical signals outputted from one of said plurality of optical signal generating means.

Moreover, as to the above optical transmitting device of the present invention, it is preferable that the optical transmitting device further comprises an optical amplifying means where each of the integrated optical signals being integrated at said integrating means is inputted thereto and an output level thereof is controlled to be fixed.

Additionally, according to the present invention, there is provided an optical communication system, transmitting to a common optical transmission line a plurality of optical signals having different wavelengths, branching at a branching device one optical signal with a particular wavelength among said plurality of optical signals so as to transmit the optical signal with the particular wavelength to a branch station, generating at said branch station another optical signal with said particular wavelength so as to transmit it to said branching device, said branching device inserting said another optical signal to said plurality of optical signals excluding the one being branched off so as to have the optical signals transmitted, said branch station generating an adjustment optical signal having a wavelength different from said particular wavelength, said branch station integrating said adjustment optical signal and said another optical signal having said particular wavelength, said branch station transmitting each of the integrated optical signals to said branching device through an optical amplifier where an output level is controlled to be fixed, said branch station adjusting a level of said adjustment optical signal.

Furthermore, according to the present invention, there is provided an optical communication system, transmitting from a terminal station to a common optical transmission line a plurality of optical signals having different wavelengths, said terminal station generating an adjustment optical signal having a wavelength different from said plurality of wavelengths, said terminal station integrating said adjustment optical signal and said plurality of optical signals, said terminal station transmitting each of the integrated optical signals through an optical amplifier where an output level is controlled to be fixed.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 3 is a waveform diagram showing wavelengths of inputs and outputs of the conventional optical amplifier.

FIG. 6 is a block diagram showing an optical communication system of an embodiment of the present invention;

FIG. 7 is a waveform diagram showing wavelengths of inputs and outputs of the optical amplifier shown in FIG. 6.

DESCRIPTION OF THE PREFERRED EMBODIMENTS

Figure 1:
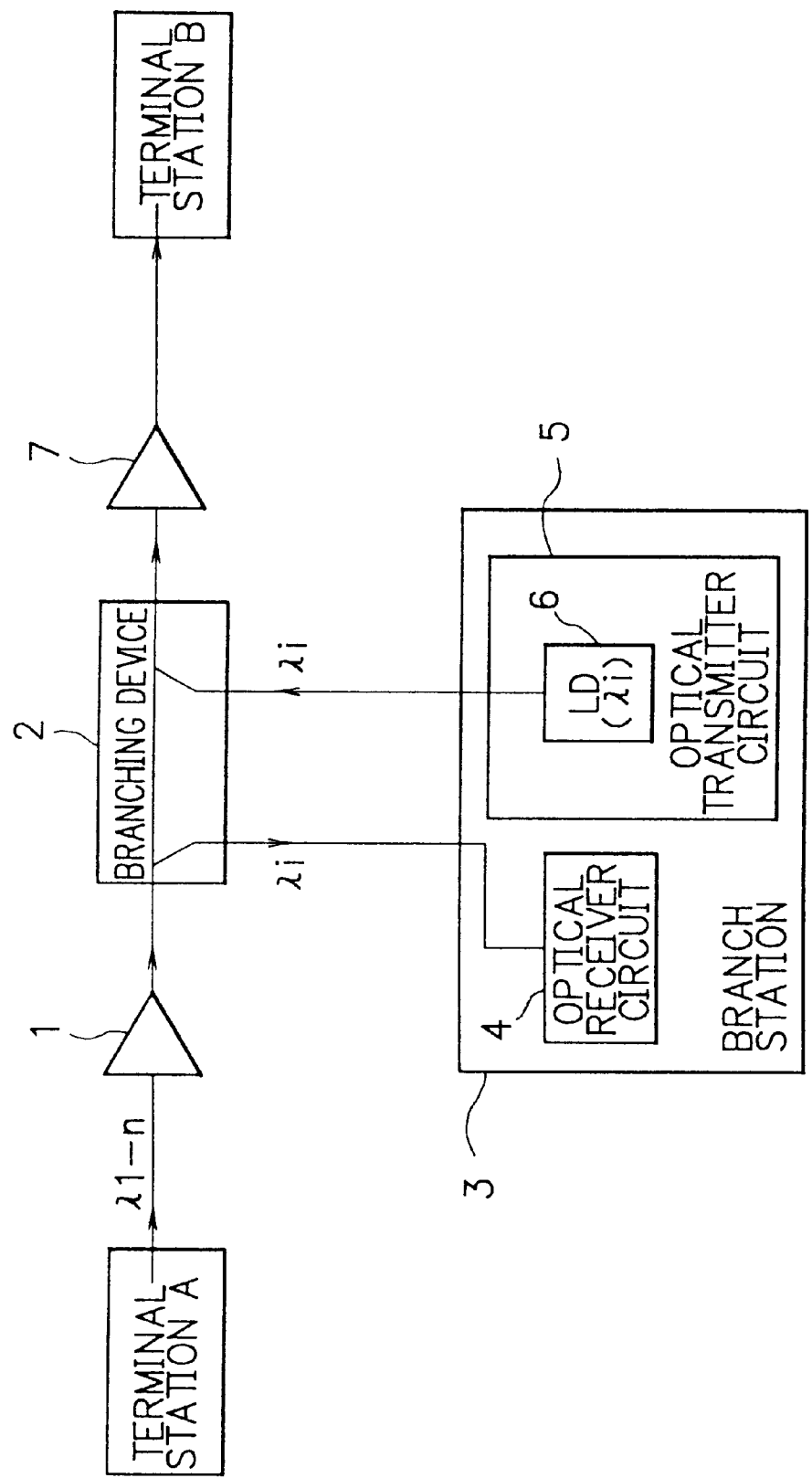
FIG. 1 is a block diagram of a conventional optical communication system.

Referring now to the drawings, an optical communication system and an optical transmitting device applied thereto corresponding to the present invention will become apparent from the following description of the preferred embodiments of the invention.

Figure 2:
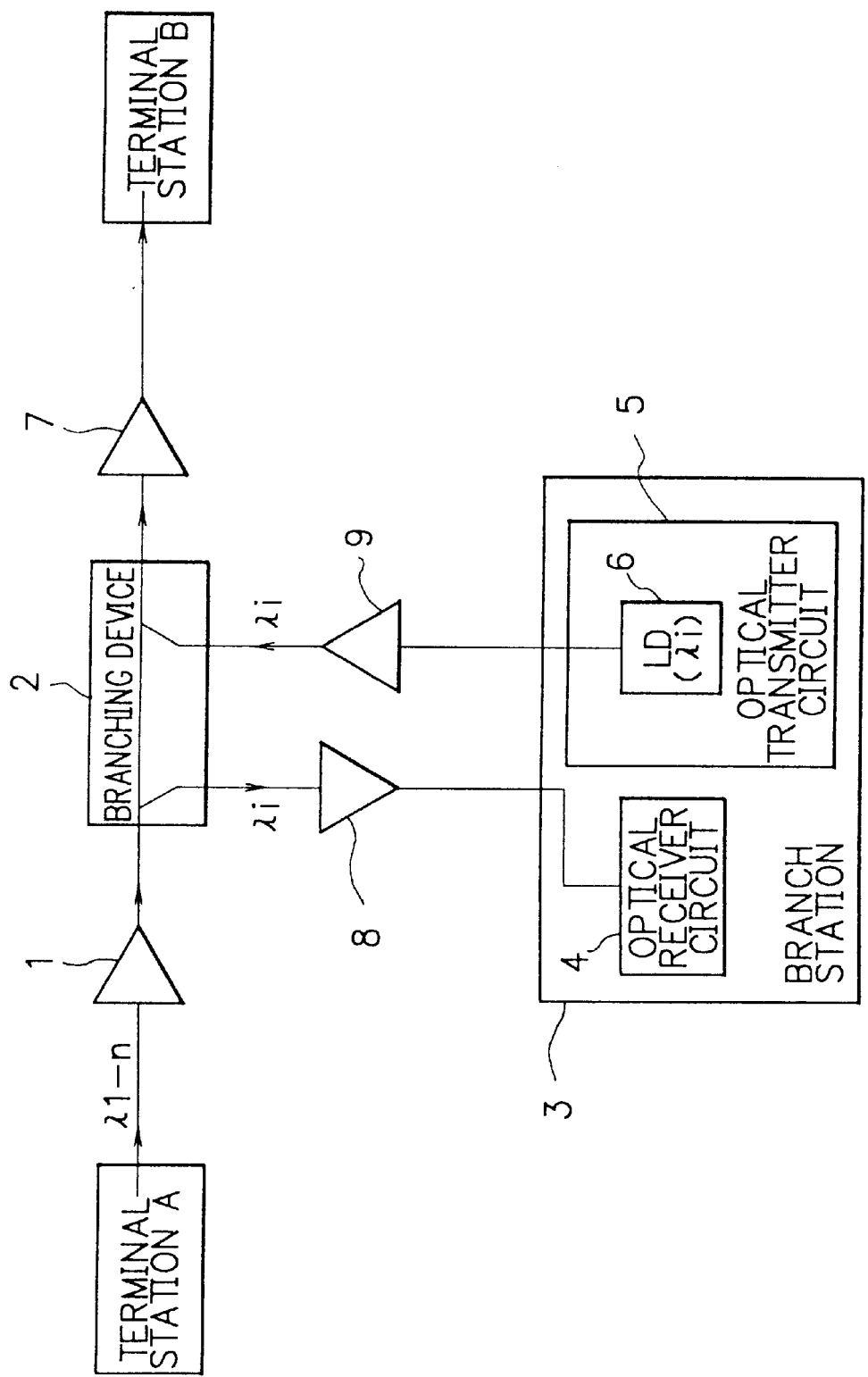
FIG. 2 is a block diagram of another conventional optical communication system.
Figure 4A:
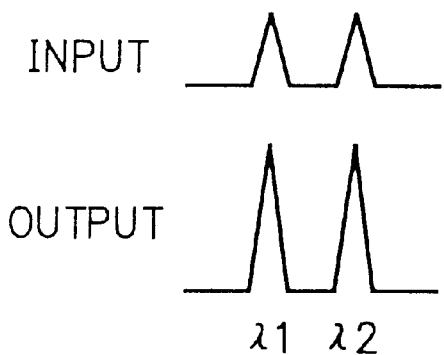
FIG. 4 is a waveform diagram showing wavelengths of inputs and outputs of the conventional optical amplifier when a signal number is altered.
Figure 4B:
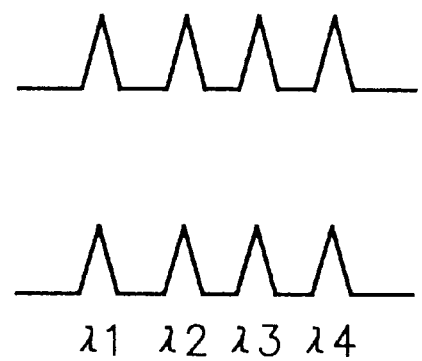
Figure 5:
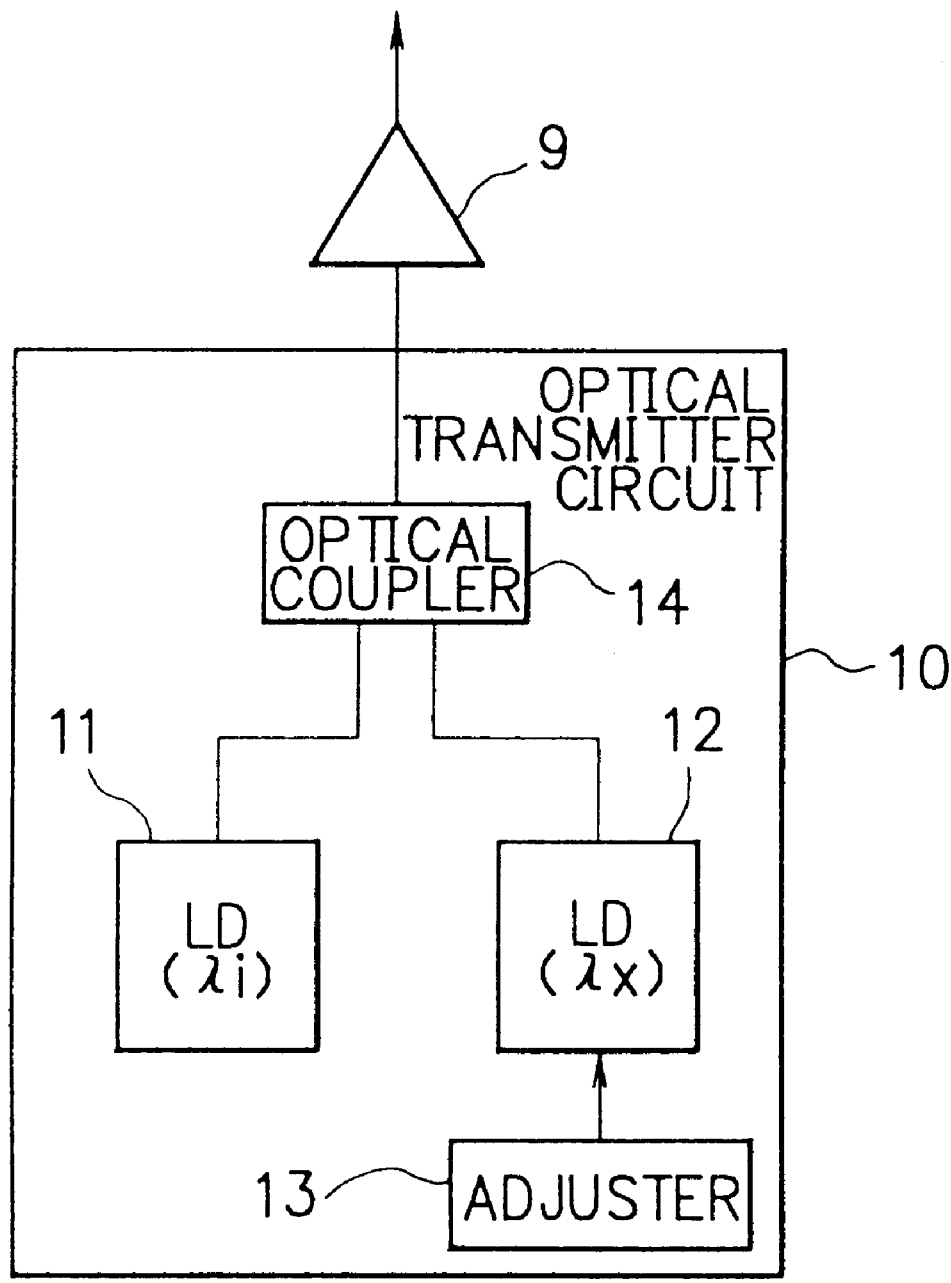
FIG. 5 is a block diagram showing an optical transmitting device of an embodiment of the present invention.

FIG. 5 shows the structure of an optical transmitter circuit as an optical transmitting device of the present invention. The optical transmitter circuit shown in FIG. 5 is used as a replacement for the optical transmitter circuit indicated in FIGS. 1 and 2.

In FIG. 5, a numerical code 10 indicates an optical transmitter circuit, 11 indicates a LD for generating an optical signal with a wavelength $\lambda i$, 12 indicates a LD for generating an adjustment optical signal with a wavelength $\lambda x$, 13 indicates an adjuster for adjusting an output level of the LD 12, and 14 indicates an optical coupler for integrating the outputs from the LDs 11 and 12 so as to transmit the output to an optical amplifier 9.

FIG. 6 shows an embodiment of an optical communication system of the present invention with an application of an optical transmitter circuit 10 indicated in FIG. 5. As to parts corresponding to those shown in FIG. 2, same numerical codes are to be used, and the identical explanation given with reference to FIG. 2 will be omitted. The optical transmitter circuit 10 is provided within the branch station 3.

Next, the operation of the optical communication system is to be described. According to FIG. 5 and FIG. 6, a transmission optical signal with the wavelength $\lambda i$ is to be outputted from the LD 11 within the optical transmitter circuit 10, while the adjustment optical signal $\lambda x$ is to be outputted from the LD 12. The optical signals with the wavelengths $\lambda i$ and $\lambda x$ are to be synthesized at the optical coupler 14 so as to be outputted from the branch station 3. The optical signal being transmitted from the branch station 3 is to pass through the optical amplifier 9 to be inputted to the branching device 2. Here, the output of the optical amplifier 9 is to become as illustrated in FIG. 7. That is, by transmitting the adjustment optical signal with the wavelength $\lambda x$ in addition to the transmission signal with the wavelength $\lambda i$, the output from the optical amplifier 9 is to have a stable output level which is practically the sum of levels of wavelength $\lambda x$ and wavelength $\lambda i$, as shown in FIGS. 7B and 7C. This indicates that the output level can be altered if the signal with the wavelength $\lambda i$ is to be focused. Therefore, by adjusting the output level of the LD 12 by applying the adjuster 13, it is possible to alter the signal level of the signal with the wavelength $\lambda i$ within the output from the optical amplifier 9. Moreover, FIG. 7A indicates the conventional case where only the signal with the wavelength $\lambda i$ is outputted from the branch station 3.

Here, FIG. 7 is to be described in more detail. The output of the present optical transmitter circuit 10 is to become the input of the optical amplifier 9 and is to be amplified at the optical amplifier 9 and thence outputted. At this point, as the output from the optical amplifier 9 is controlled to become fixed, the input is to become as follows: $\lambda i + \lambda x = 1$. Furthermore, the relation between the wavelengths $\lambda i$ and $\lambda x$ are to be given by the following expressions: as to the wavelength $\lambda i$, $\lambda i/(\lambda i + \lambda x)$, and as to the wavelength $\lambda x$, $\lambda x/(\lambda i + \lambda x)$.

For instance, in assuming that the gain of the optical amplifier 9 is 10 dB (10 times);

(a) the output when $\lambda x$ equals 0 is $\{\lambda i/(\lambda i+\lambda x)\}\times 10=\{\lambda i/(\lambda i+0)\}\times 10=10,$ (b) the output when $\lambda x$ equals $\lambda i$ is $\{\lambda i/(\lambda i+\lambda x)\}\times 10=\{\lambda i/(\lambda i+\lambda i)\}\times 10=5,$ and (c) the output when $\lambda x$ equals $2\lambda i$ is $\{\lambda i/(\lambda i+\lambda x)\}\times 10=\{\lambda i/(\lambda i+2\lambda i)\}\times 10=3.3.$ Accordingly, it is easy to change the level of the optical signal with the wavelength $\lambda i$ by altering the level of the optical signal with the wavelength $\lambda x$.

According to the present embodiment, it is possible to obtain improved operation efficiency at the time of cable setting. This is possible because the input level of the branching device 2 does not have to be adjusted by the cable or the optical amplifier for the output level of each of the signals from the branching device 2 is capable of being fixed due to manipulation at the branch station 3.

Moreover, according to the present embodiment, it is possible to augment the transmission capacity after the system is being built. This is possible since the output level for each of the wavelengths $\lambda 1 \sim \lambda n$ of the branching device 2 can be fixed owing to the fact that the insertion signal level of the insertion optical signal from the branch station 3 with the wavelength $\lambda i$ is capable of being adjusted although the input level of the transmission signal of the branching device 2 is to become small with regard to the increase of the transmission capacity from the terminal station A.

Figure 8:
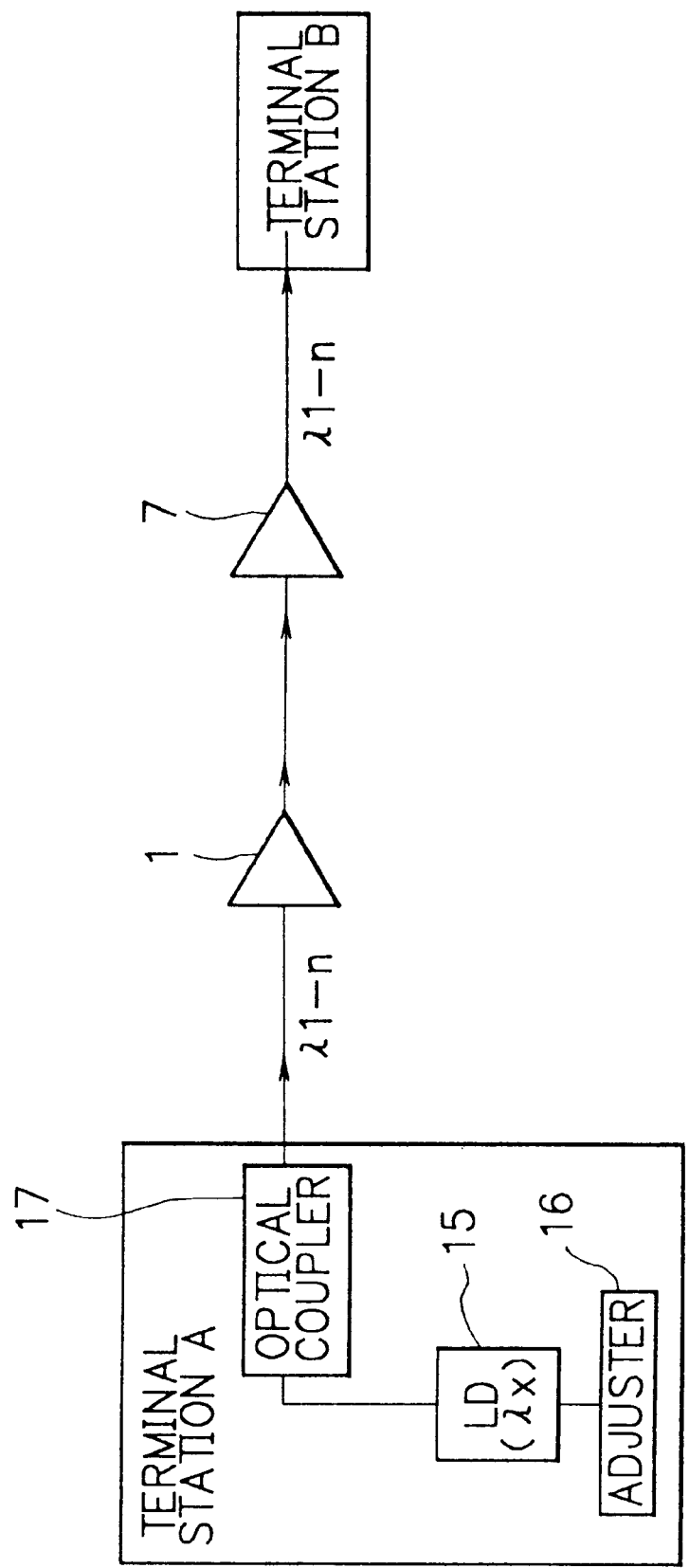
FIG. 8 is a block diagram showing an optical communication system of another embodiment of the present invention.

FIG. 8 shows another embodiment of the present invention, where optical signals with wavelengths $\lambda 1 \sim \lambda n$ are transmitted by WDM transmission from a terminal station A to terminal station B through optical amplifiers 1 and 7. At the terminal station A, there is provided a LD 15 for generating an adjustment optical signal with a wavelength $\lambda x$, an adjuster 16 for adjusting the output level of the LD 15 and an optical coupler 17 for synthesizing the adjustment optical signal and the other transmission optical signals.

Such structure indicated above can also be taken in adjusting the level of the adjustment optical signal even when the output levels of the optical amplifiers 1 and 7 are controlled to be fixed, which results in easy alteration of the level of the transmission optical signal. In addition, according to the present embodiment, the terminal station A serves as the optical transmitting device of the present invention.

As being described above, according to the present invention, there is provided an optical transmitting device where a plurality of optical signals with different wavelengths are being generated and synthesized to be outputted, and one optical signal among the plurality of optical signals is arranged so that it can have its level adjusted. This optical signal capable of being adjusted is employed as an adjustment optical signal for adjusting the level of another optical signal. Therefore, the level of another optical signal within the output from the optical amplifier can easily be changed by simply adjusting the level of the adjustment optical signal, even when there is applied an optical amplifier and such where the output level is controlled to be fixed.

Accordingly, in applying the present invention to the optical communication system having optical ADM function and conducting WDM transmission, it is possible to obtain better operation efficiency at the time of cable setting, and it is also possible to easily adjust the levels of optical signals and increase the transmission capacity.

Moreover, according to the optical communication system of the present invention, an optical signal with a particular wavelength and an adjustment optical signal with a different wavelength are generated and integrated at the branch station after which a signal with an integrated wavelength passes through the optical amplifying means having the output level being controlled to be fixed, so as to be finally transmitted to the branching device.

Furthermore, according to the optical communication system of the present invention, a plurality of optical signals with different wavelengths and an adjustment optical signal are generated and integrated at the terminal station after which a signal with an integrated wavelength passes through the optical amplifying means having the output level being controlled to be fixed, so as to be eventually transmitted to the branching device.

Consequently, according to the optical communication system of the present invention, it is possible to obtain better operation efficiency at the time of cable setting, and it is also possible to easily adjust the levels of optical signals and increase the transmission capacity.

While preferred embodiments of the invention have been described using specific terms, such description is for illustrative purposes only, and it is to be understood that changes and variations may be made without departing from the spirit or the scope of the following claims.

What is claimed is:

1. An optical communication system, comprising:

a common optical transmission line through which a plurality of optical signals having different wavelengths is transmitted;

a branching device which branches off one optical signal with a particular wavelength from among said plurality of optical signals so as to transmit said optical signal with the particular wavelength to a branch station; and said branch station which generates another optical signal with said particular wavelength so as to transmit it to said branching device, said branching device inserting said another optical signal into said plurality of optical signals excluding the one being branched off, said branch station generating an adjustment optical signal having a wavelength different from said particular wavelength, said branch station integrating said adjustment optical signal and said another optical signal having said particular wavelength, said branch station transmitting each of the integrated optical signals to said branching device through an optical amplifier having an output level controlled to be at a fixed level, and said branch station adjusting a level of said adjustment optical signal.

2. A method for performing WDM transmission in an optical communication system having ADM functions, comprising the steps of:

transmitting from a terminal station to a common optical transmission line a plurality of optical signals having different wavelengths and having an adjustable level for altering the level of output signals from said system;

generating an adjustment optical signal having a wavelength different from said plurality of wavelengths;

integrating said adjustment optical signal and said plurality of optical signals; and transmitting each of the integrated optical signals through an optical amplifier in which an output level therefrom is controlled to be at a fixed level.

* * * * *